Feb. 4, 1958 V. F. GAYLOR ET AL 2,822,324
POLAROGRAPHIC APPARATUS AND METHOD
Filed Jan. 28, 1955 2 Sheets-Sheet 1

*INVENTORS*
V. FRANCES GAYLOR
BY JEAN LANDERL

*Leland L. Chapman*
ATTORNEY

United States Patent Office 2,822,324
Patented Feb. 4, 1958

2,822,324

POLAROGRAPHIC APPARATUS AND METHOD

Verna Frances Gaylor, Cleveland, and Jean Landerl, Shaker Heights, Ohio, assignors to The Standard Oil Company, Cleveland, Ohio, a corporation of Ohio Application January 28, 1955, Serial No. 484,808

5 Claims. (Cl. 204—1)

The present invention relates to an apparatus and method for the study of electrochemical phenomena. More particularly, it concerns an improved apparatus and method for the electrochemical analysis of non-aqueous solutions.

It has long been known that every electrolytic decomposition takes place at a definite voltage, termed the decomposition potential, which is characteristic of the particular substance being decomposed. Ideally, if a voltage less than the decomposition potential of a substance is applied between electrodes immersed in a solution of that substance, no decomposition takes place and substantially no current flows. On the other hand, if a voltage at least equal to the decomposition potential is applied, electrolysis occurs and the strength of the electrolyzing current is proportional to the concentration of the substance in the solution. It follows, therefore, that when a gradually increasing voltage is applied between electrodes immersed in a solution of several substances, no appreciable current will pass until the lowest decomposition potential is reached. When this value is attained, a current proportional to the concentration of the respective substance flows. This current is known as the diffusion current. When the next higher decomposition potential is reached, a sudden increase in current occurs proportional to the concentration of this second substance, and so on. The determination of such a current-voltage curve thus amounts to a qualitative and quantitative analysis of a solution.

The theory and practice of this analytical method, frequently termed "polarographic" analysis, have been widely investigated. (See "The polarographic method," by J. Heyrovsky, in "Physikalische Methode in der Chemischen Analyse," vol. 11, by W. Böttger, Akad.-Verlags-Ges., Leipzig, 1936, or the extensively annotated monograph "Chemische Analysen mit dem Polarographen," by H. Hohn, J. Springer, Berlin, 1937.) Analyses are for the most part carried out with the aid of special apparatus, particularly the Heyrovsky-Shikata "Polarograph" (Rec. trav. chim. 44, 496–8 (1925); "The Polarograph," E. Leybold's Nachfolger A.-G., Koln (1937)), and the current voltage curve drawn by this instrument is generally referred to as a "polarogram."

In the usual polarograph, a reference electrode of known potential and an indicating electrode are immersed in a vessel containing the solution to be analyzed. A slowly increasing potential is applied between the electrodes by means of a slide-wire potentiometer arranged so that the slide is drawn at a uniform rate by a small motor. The variations in current caused by the increasing voltage and the voltage itself may be recorded by means such as a movable stylus responsive to the current and a strip of paper wound on a rotating drum.

Various indicating and reference electrodes have been suggested for the polarograph. When analyzing for most inorganic compounds, the most satisfactory indicating electrode has been found to be a "dropping mercury" electrode. However, the "dropping mercury" electrode has been found to be unsuitable for the polarographic analyses of many oxidizable organic compounds because of the fact that mercury will oxidize at approximately 0.4 volt and this value is below the oxidation potential of most organic compounds. Consequently, there have been various suggestions as to other materials for use as indicating electrodes when the polarograph is used for the analysis of oxidizable organic compounds. Among the materials suggested have been gold, platinum, and graphite. The graphite electrode in particular has been found to have utility in polarographic analyses of organic compounds. However, at very low concentrations (below 500 p. p. m.) of the organic compound which is to be analyzed, the ordinary graphite electrode of the prior art is relatively insensitive and erratic.

The polarograph has been accepted as an analytical tool in many industries. In particular, it has been widely accepted for analytical work in the petroleum industry. One of the more common analytical determinations for which the polarograph is employed by the petroleum industry is the determination of the amount of tetraethyl lead in gasoline. Because of the ease and simplicity with which a polarographic analysis may be made, workers in the petroleum industry have constantly striven to broaden the application of the polarograph to their analytical work. One of the more difficult analytical problems faced by the petroleum industry is the determination of the amount and kind of organic compounds which are frequently added in very small amounts to a number of petroleum products in order to enhance their quality. Among the organic compounds that are added to petroleum products are organic oxidation inhibitors which may be added in amounts as small as 10 parts per million or less. Heretofore, the determination of the exact amount of such inhibitors in a petroleum product has been rather complicated. The usual procedure was to first extract the organic compound from the petroleum stock and then analyze the extracted compound. Petroleum products containing small amounts of organic compounds could not be adapted to polarographic analysis without such an extraction step. Heretofore, if the polarographic analysis were performed directly on the petroleum stock, no distinguishable polarographic curve was obtained.

Accordingly, one of the objects of this invention is to provide an improved polarograph which makes it possible to analyze directly, without resort to extraction, a hydrocarbon stock containing small amounts of organic compounds.

Another object of this invention is to provide an improved apparatus and method which is useful in the polarographic analyses of solutions containing small amounts of organic compounds.

More particularly, it is the object of this invention to provide an improved indicator electrode which is sensitive and accurate for the polarographic analyses of solutions containing minor amounts of organic compounds, i. e., concentrations below 500 p. p. m.

We have discovered a new polarographic indicating electrode which meets the objects of this invention as set forth above. In brief, the invention consists of a graphite electrode impregnated with an electrically inert compound and a polarographic apparatus employing such an indicating electrode. It is to be understood that the word "impregnated" as used in this application means to fill or saturate as distinguished from the word "coated" which means merely to provide an outer layer or cover. There have been suggestions in the prior art for coating graphite electrodes with a sealing compound, but such electrodes are to be distinguished from the electrodes of this invention as will be apparent from the discussion below.

The invention may be better understood by reference to the attached drawing wherein similar figures denote similar parts throughout and in which.

Figure 1:
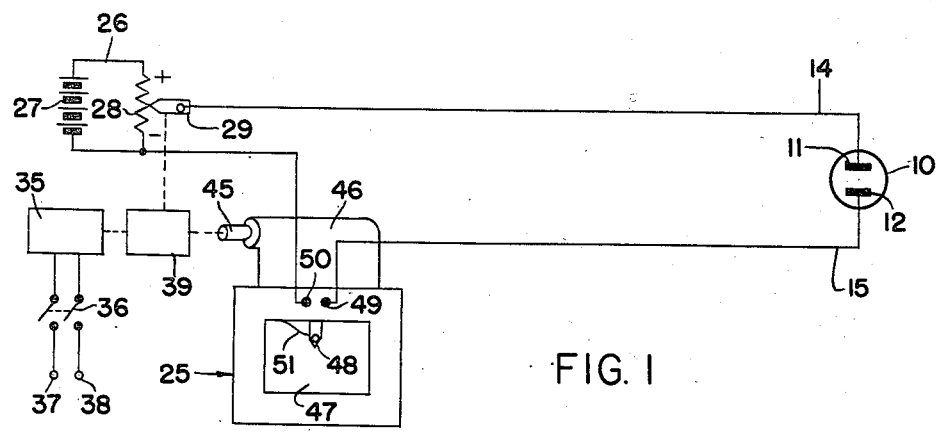
Figure 1 is a schematic diagram of a polarographic apparatus constructed according to the invention.

Referring now to Figure 1, there is shown a polarographic test cell 10 having an indicating electrode 11 and a reference electrode 12. Test cell 10 is connected in a loop circuit with a recorder 25 and an electrical energy source means 26, the several elements of the loop circuit being serially coupled around the circuit. This circuit forms a conventional polarographic testing system suitable for use with non-aqueous cell solutions.

Considering the two last named components of the loop circuit, the electrical energy source means 26 takes the form of a D. C. energy source 27 (shown as a battery) which develops a constant D. C. potential across a potentiometer 28. Potentiometer 28 has a variable tap 29 which is connected in the circuit so that at least a fraction of the voltage $V_E$ (exciting voltage) appearing between tap 29 and the lower end of the potentiometer is applied across the test cell 10. Since there are no resistances for other components of substantial impedance interposed in the circuit between potentiometer 28 and test cell 10, the full value of the exciting voltage is applied across the cell, or, in other words, the exciting voltage $V_E$ equals the applied voltage $V_A$. To initiate a polarographic analysis, a conventional electric motor 35 is energized by throwing a double pole single throw switch 36 to connect the motor through the terminals 37, 38 to an electrical energy source (not shown). When energized, motor 35 drives a gear box 39 which in turn moves variable tap 29 at a constant rate from the lower to the upper end of the potentiometer 28. Preferably the potentiometer 28 is so constructed that as tap 29 moves, the exciting voltage starts at zero value and increases in a manner which is linear with time. It is within the scope of this invention to have the exciting voltage changed either positively or negatively from its initial value provided that there is a change in absolute magnitude of the exciting voltage over the course of an analysis.

Gear box 39 concurrent with its function of moving tap 29, performs the additional function of operating recorder 25 by driving a shaft 45 thereof upon which is rolled a record strip 46. Record strip 46, accordingly, moves vertically through a plotting area 47 in which there is located a plotting stylus 48. Plotting stylus 48 is actuated by conventional means (not shown) within recorder 25 to undergo horizontal displacements in direct proportion to the amount of current passing through test cell 10 via the recorder terminals 49, 50. At the same time by appropriate gearing within the gear box 39 the instantaneous position of record strip 46 is made to bear a pre-selected constant ratio to the value of the exciting voltage concurrently developed by movement of tap 29. Accordingly, the stylus 48 will trace out over record strip 46 an exciting voltage cell current curved as shown by the line 51. The vertical position of any point on this curve will represent (according to the scale used for the vertical coordinate of the plot) a simple measure of the value of the then existing exciting voltage. For example, the relation between plot position and exciting voltage may be 1 to 1 that one unit of vertical displacement of strip 46 is measured by the vertical co-ordinate scale (whether a linear scale or another scale such as logarithmic) represents one unit of exciting voltage.

It will be understood that gear box 39 includes conventional means (not shown), for resetting tap 29 and recorder 25 after completion of an analysis.

When test cell 10 is employed to analyze a non-aqueous solution the voltage drop due to the internal resistance of the cell may be considerable and the voltage $V_A$ applied across the cell may not be equated with $V_P$, the true polarization voltage of the cell. As stated above, the applied voltage for the described circuit connections equals $V_E$, the exciting voltage developed by tap 29. Accordingly, the curve traced out by stylus 48 bears a relation to the true polarization voltage cell current curve but is not the same as the true polarization voltage cell current curve. The voltage drop and current due to the internal resistance of the cell must be subtracted from this curve 51 in order to obtain the true polarization curve. This may be done either by mathematical calculation after the completion of the analysis or the circuit may be modified by appropriate means so as to produce the true polarization voltage cell current curve such as are described in co-pending application Serial No. 441,802, filed July 7, 1954, which has been assigned to our assignee.

Figure 2:
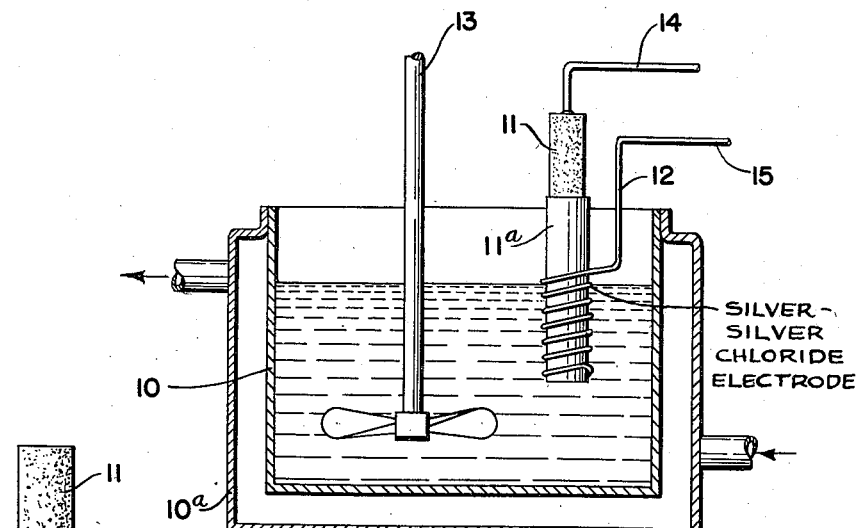
Figure 2 is a view showing details of the polarographic test cell of Figure 1.

Considering now Figure 2 which shows the details of test cell 10, this cell is provided with a water jacket 10a so as to make possible the maintenance of a constant temperature during the analysis. The test cell 10 also contains a stirring rod 13 which may be rotated by an electric motor (not shown) which serves to agitate the test solution whereby greater sensitivity in the analysis can be obtained. The indicating electrode 11 consists of a graphite electrode impregnated with the compound of this invention which is connected to the polarographic test circuit by an appropriate electrical conduit 14. The reference electrode 12 in this case is a silver wire, having deposited thereon an amount of silver chloride, which is connected to the polarographic test circuit by electrical conduit 15. The coated silver wire is placed in proximate relation to the electrode 11 as shown in Figure 2. The reference electrode may be constructed from other materials within the scope of this invention, but the silver-silver chloride electrode has proven to be particularly advantageous in the analysis of non-aqueous solution.

Figure 3:
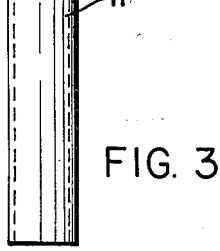
Figure 3 is a view of an indicating electrode constructed according to the invention.

Figure 3 is a view of the impregnated electrode 11 showing particularly the outer coating 11a which must be applied to the electrode so that only the bottom surface of the electrode is exposed to the test solution and also to insulate the indicating electrode 11 from any contact with the reference electrode 12.

The indicating electrode of this invention is prepared from a graphite electrode of the type which has been used heretofore for polarographic analyses. The graphite electrode is impregnated with an electrically inert compound which permeates the electrode so as to enter the porous regions of the graphite and fill the void spaces therein. The method of impregnating the electrode is not critical to this invention; however, one method that has been found to be suitable is to soak the electrode in the liquid compound. As most of the compounds useful in connection with this invention are solid at room temperature, it will usually be necessary to heat the compound in order to place it in a liquid state. Generally, a satisfactory degree of impregnation can be obtained by soaking the electrode for a period of about one hour. However, depending upon the compound employed, this time may vary as the graphite will adsorb certain compounds more readily than others.

The impregnating compound used in connection with this invention should be adapted to the properties of the solution in which it is to be employed and should be essentially a non-conductor of electricity. For example, when hydrocarbon solutions are to be analyzed polarographically, the compound should be of a type that is insoluble in hydrocarbon so that the test solution will not remove the compound from the electrode. The sealing compounds which have proved most effective in the preparation of the electrode of this invention are certain waxes. For example, ceresin wax, Opal wax and Castor wax have all proven to be very effective in connection with this invention. Ceresin wax is a purified mineral wax which is sometimes used as a substitute for beeswax. Opal wax and Castor wax are both manufactured by the hydrogenatiton of castor oil. The latter two waxes are particularly advantageous in preparing impregnated graphite rods for the analysis of hydrocarbon solutions as both of these waxes are insoluble in hydrocarbon. Other impregnating agents such as Saran resin, Sylon, silicone resin, lemon wax, Ceramid wax and various silicone compounds have proven to be useful in connection with this invention.

The impregnated electrode should be provided with a protective outer layer before it is employed in a polarographic analysis. This is done so that only the bottom surface of the electrode is in contact with the solution to be analyzed, thereby providing a constant area for the polarographic oxidation. Again this outer coating should be adapted to the solution in which the graphite rod is to be employed. It should also be compatible with the material that is used to impregnate the electrode. One such coating that has been used with electrodes impregnated with Opal wax is "Seal-All," a cement which is a solution of a mixture comprising 87% polyvinyl chloride and 13% polyvinyl acetate in acetone. The outer coating, in this case "Seal-All," was brushed on at room temperatures and it dried readily at room temperature to leave a hard non-brittle coating which was insoluble in water, alcohol or hydrocarbon. The coating should be non-brittle since the tip of the graphite electrode must be broken off to provide a fresh graphite surface for each polarographic analysis. Brittle coatings would tend to expose undesired surfaces when the tip of the electrode is broken off.

The graphite electrodes of this invention have proven to be extremely useful in the analysis of organic solutions containing very small amounts of the unknown constituents. As was pointed out above, the problem heretofore in analyzing for minute amounts of organic compounds has been the large amount of residual current occasioned by the use of a graphite electrode. The residual current is an inherent property of the graphite electrode and does not relate to the composition of the solution to be analyzed. When analyzing for very small amounts of organic compounds the residual current caused by the ordinary graphite electrode is of a magnitude that obscures the current-voltage curve of the compound rendering analysis difficult, if not impossible. The graphite electrode of this invention has considerably reduced the objectionable residual currents which have been a characteristic of the prior art graphite electrodes. In this manner, extremely sensitive and accurate analyses for small amounts (below 500 p. p. m.) or organic compounds have been made possible. For example, when using a graphite rod impregnated with Opal wax in analyzing for certain organic compounds, the sensitivity of the polarograph is increased by a factor of 100. In other words, the ratio of diffusion current, which is the current actually produced upon the decomposition of the organic compound, to the residual current is 100 times greater.

To illustrate the improvement over the prior art, two polarographic analyses were conducted on a gasoline sample containing 20 parts per million of a phenylene diamine. One of the analyses was conducted in an apparatus having a graphite electrode impregnated with Opal wax, while the other was conducted in an apparatus employing the graphite electrode of the prior art.

The gasoline containing the phenylene diamine was mixed with an equal volume of 0.2 molar solution of lithium chloride with isopropyl alcohol in accordance with conventional polarographic techniques. This mixture was then placed in the polarograph test cell. A potential equal to 90% of the full potential span which is to be applied to the solution was impressed upon the test cell for a period of two minutes while stirring the solution. This pre-treatment of the test solution is necessary to give reproduceable results. The solution was then allowed to stand for another three minutes until the potential impressed across the test cell reached −0.25 volt and the analysis was then started. Stirring was continued throughout the pre-treatment period and during the analysis only in the case of the apparatus employing the electrode of this invention. In the apparatus employing the graphite electrode of the prior art, a diffusion current of 1.4 microamperes was obtained while the residual current was 10.7 amperes. The graphite electrode of the prior art did not produce a distinguishable polarogram. In the apparatus employing the graphite electrode impregnated with Opal wax, the diffusion current was 2.19 microamperes while the residual current was reduced to 0.18 microampere. The impregnated electrode gave a distinct polarogram from which the concentration of the phenylene diamine in the original sample of gasoline was found to be about 20 p. p. m., the known concentration of the sample.

Other examples of the improvements in polarographic analysis made possible by this invention are shown in the following table wherein all current values are in microamperes.

| Compound | Concentration (p. p. m.) | Electrode Type | Diffusion Current | Residual Current | Ratio of Diffusion to Residual Current |
| --- | --- | --- | --- | --- | --- |
| Aminophenol | 165 | Ordinary | 39.5 | 13.2 | 3.0 |
|  |  | Impreg | 7.7 | 0.1 | 77 |
| Hydroquinone | 110 | Ordinary | 14.0 | 6.6 | 2.1 |
|  |  | Impreg | 12.5 | 0.16 | 78 |
| Phenol | 94 | Ordinary | 20.0 | 15.2 | 1.3 |
|  |  | Impreg | 2.7 | 0.12 | 22 |

Figure 4:
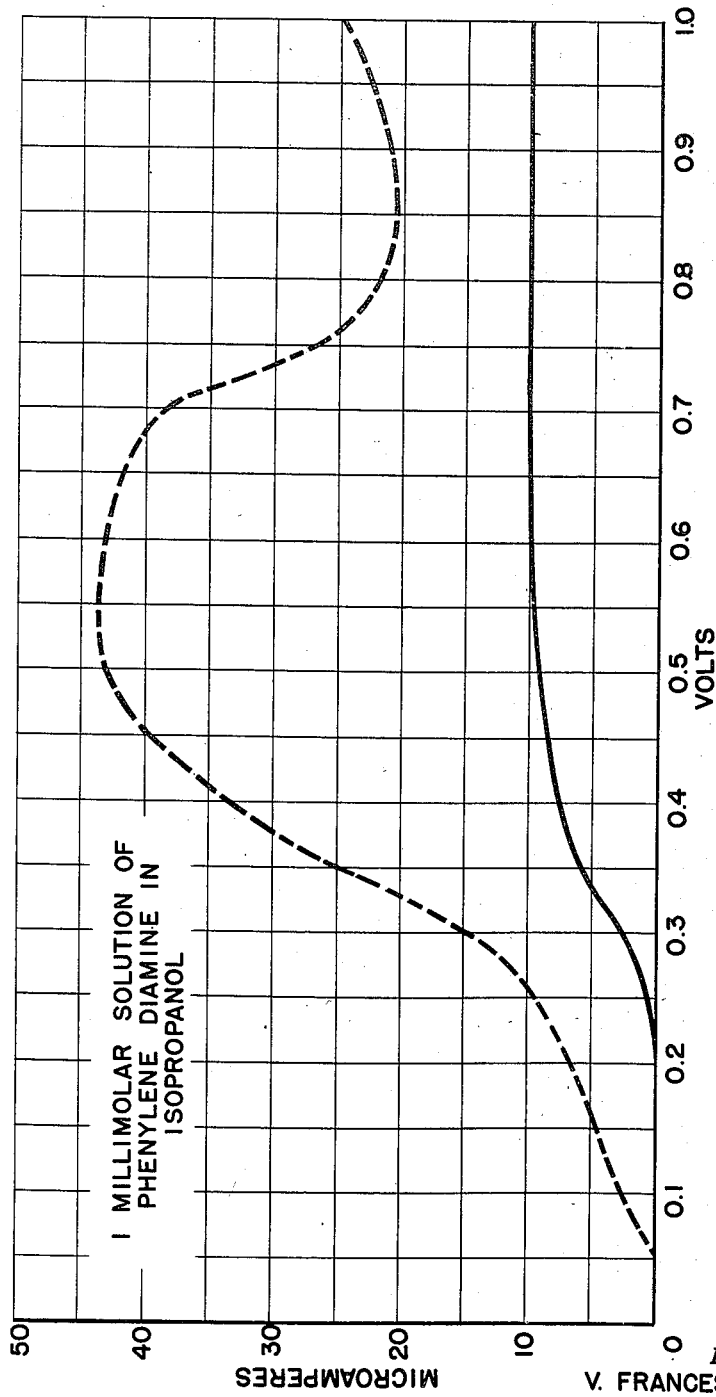
Figure 4 is a polarogram illustrating the advantage of this invention.

The utility of this invention can be better understood by an inspection of Figure 4 of the drawing wherein two polarograms are shown which illustrate the improvement over the prior art made possible by this invention. The polarograms represent two separate analyses of a one milli-molar solution of phenylene diamine in isopropyl alcohol. One of the analyses was performed with a graphite electrode of the prior art while the other was conducted in an apparatus employing an impregnated graphite electrode of this invention. The polarogram produced by the ordinary graphite electrode of the prior art is represented by the broken line and even a person skilled in polarographic analysis could not draw valid conclusions as to the concentration of phenylene diamine in the solution as result of inspecting this curve. The polarogram obtained when employing the impregnated graphite electrode of this invention is represented by a solid line and is a very clear polarogram of the type desired. From this polarogram the concentration of phenylene diamine in the solution was found to be one milli-molar which was the known concentration.

This application is intended to cover all modifications of this invention which will occur to those skilled in the art and which fall within the scope of the appended claims.

We claim:

1. A polarographic apparatus comprising means for containing a solution to be analyzed, a reference electrode and an indicating electrode disposed to contact said solution, said indicating electrode being a graphite electrode impregnated with an electrically inert wax selected from a group consisting of hydrogenated castor oil and ceresin wax, means for impressing a recurrent substantially linear voltage sweep across said electrodes giving rise to a varying flow of current therebetween, and indicating means immediately responsive to the variations in said current.

2. A polarographic electrode comprising a graphite electrode impregnated with an electrically inert wax selected from a group consisting of hydrogenated castor oil and ceresin wax.

3. A polarographic electrode according to claim 2 in which said wax is a hydrogenated castor oil.

4. A polarographic electrode according to claim 2 in which said wax is ceresin wax.

5. A polarographic method for determining small amounts of organic compounds in non-aqueous solutions which comprises the steps of disposing the solution to be analyzed between a first electrode consisting of a graphite rod impregnated with an electrically inert wax selected from a group consisting of hydrogenated castor oil and ceresin wax and a second electrode consisting of a silver wire having silver chloride deposited thereon, the step of impressing a gradually increasing voltage across said electrodes and the step of recording the values of the current obtaining between the said electrodes when said gradually increasing voltage is impressed across said electrodes.

References Cited in the file of this patent

UNITED STATES PATENTS

| 1,547,539 | Von Antropoff | July 28, 1925 |
| 1,909,800 | Barton | May 16, 1933 |

OTHER REFERENCES

Lord et al.: Anal. Chem., vol. 26 (No. 2), February 1954, pp. 284–295 (p. 285 relied on).